United States Patent [19]
Petrisko et al.

[11] Patent Number: 5,505,630
[45] Date of Patent: Apr. 9, 1996

[54] COVER ASSEMBLY FOR A PLUG-IN OPENING OF A BUSWAY SYSTEM

[75] Inventors: John D. Petrisko, West Mifflin; Paul A. Colbaugh, Jeannette, both of Pa.

[73] Assignee: Eaton Corporation, Cleveland, Ohio

[21] Appl. No.: 210,194

[22] Filed: Mar. 18, 1994

[51] Int. Cl.$^6$ ..................................................... H01R 13/44
[52] U.S. Cl. ............................................. 439/137; 439/114
[58] Field of Search ..................................... 439/113, 114, 439/116, 135, 136, 137, 138, 140

[56] References Cited

U.S. PATENT DOCUMENTS

| | | | |
|---|---|---|---|
| 3,148,008 | 9/1964 | Herrmann | 439/114 |
| 3,209,301 | 9/1965 | Duffy, Jr. | 439/114 |
| 3,922,053 | 11/1975 | Hafer | 439/114 |
| 4,528,429 | 7/1985 | Dobson et al. | 439/137 X |
| 4,565,908 | 1/1986 | Bould | 361/345 |

*Primary Examiner*—Khiem Nguyen
*Attorney, Agent, or Firm*—Martin J. Moran

[57] ABSTRACT

A busway system having several parallel bus bars arranged in a housing with a plug-in opening in a front wall of the housing employs a cover assembly with a plug-in unit over the plug-in opening. The cover assembly has a brick mounted onto the front wall of the housing, and a shutter attached to the brick. The brick has a plurality of cavities each of which receive a stab of one of the bus bars, and has a guide opening along its bottom wall on opposed ends. The shutter extends across the front of the brick, is positionable over the several cavities of the brick, and has a configuration corresponding to the arrangement of the cavities. A cam-linkage assembly located on opposed sidewalls of the brick is spring biased and allows the shutter to be moved along tracks of the brick for opening and closing the cavities. The plug-in unit has guide probes which enter the guide openings along the bottom of the brick as the plug-in unit is being installed onto the busway system. The guide probes contact cams of the cam-linkage assemblies, causing the cams to rotate to move the links and, therefore, the shutter in an open positioning for the cavities. Removal of the plug-in unit from the busway system removes the guide probes from the guide openings of the brick, thereby allowing the springs to move the shutter to its previous positioning to close the cavities in the brick.

12 Claims, 5 Drawing Sheets

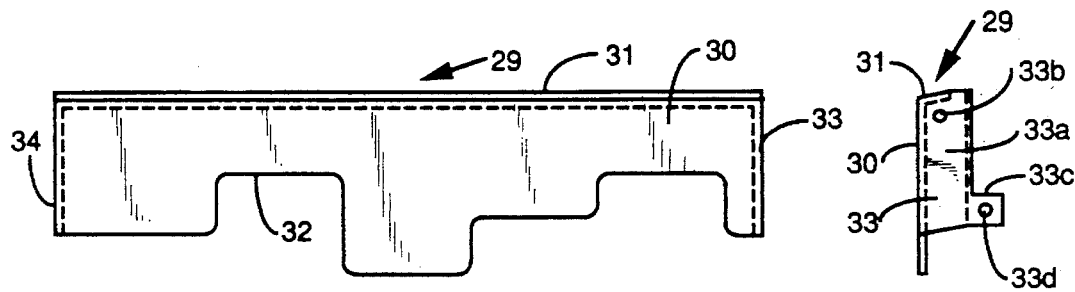
FIG. 6　　　　　　　　　　　　FIG. 8
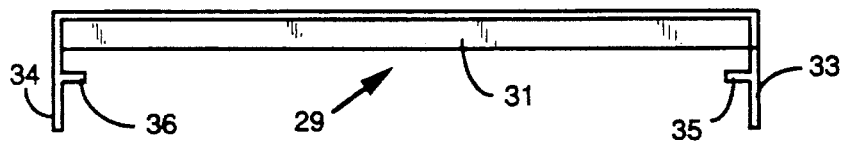
FIG. 7
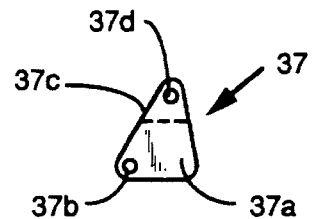 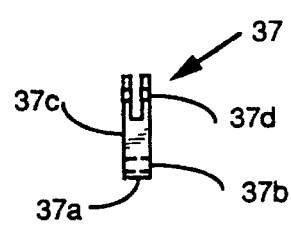
FIG. 9　　　　　　　　　　　　FIG. 10
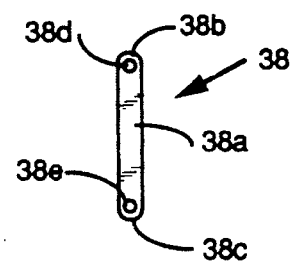 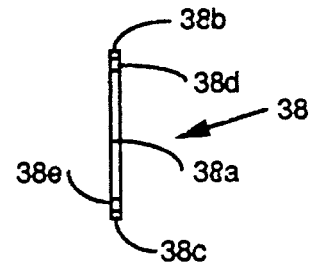
FIG. 11　　　　　　　　　　　　FIG. 12

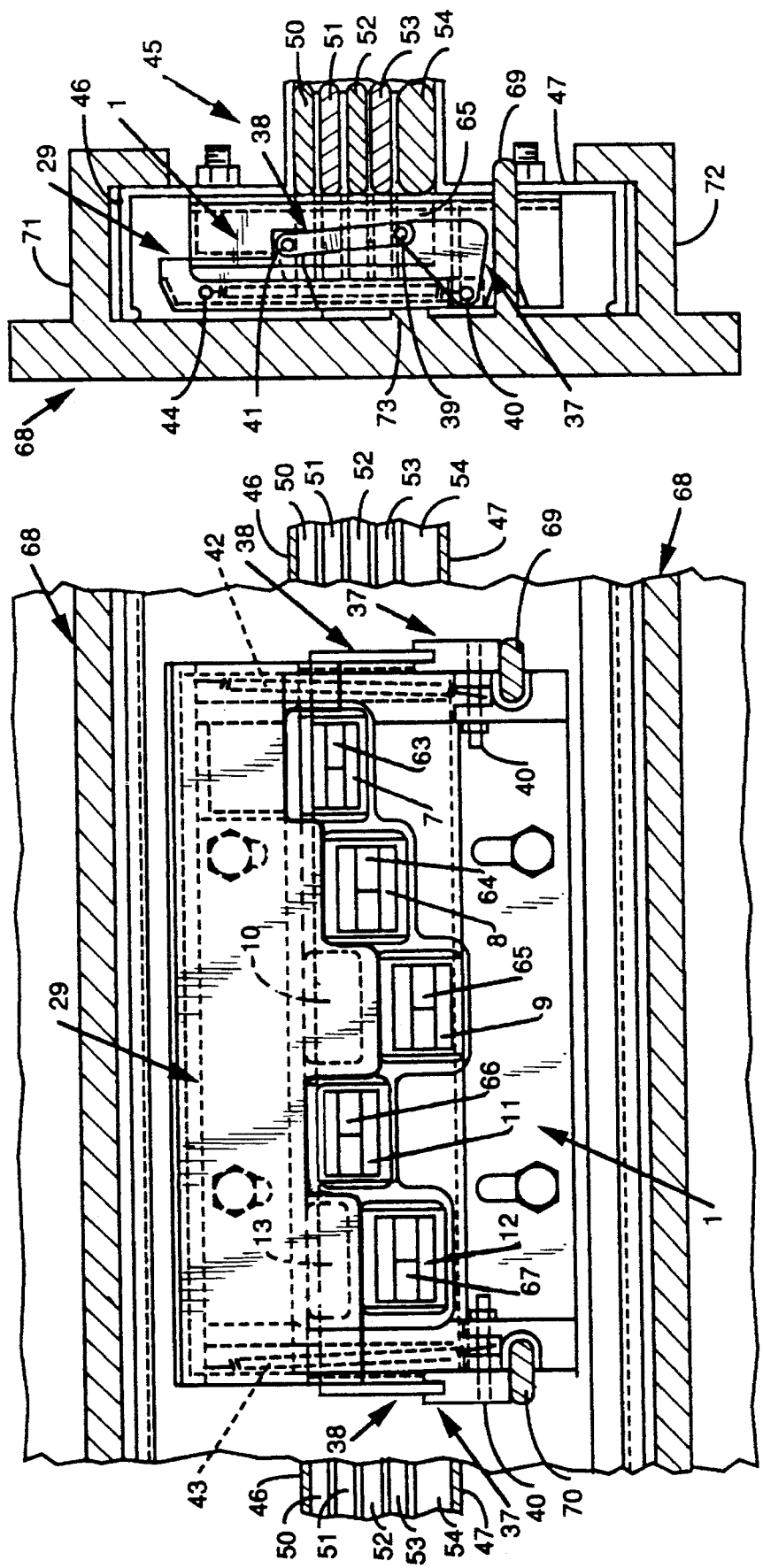

COVER ASSEMBLY FOR A PLUG-IN OPENING OF A BUSWAY SYSTEM

BACKGROUND OF THE INVENTION

1. Field of the Invention

This invention relates to a busway system and, more particularly, to a cover assembly mounted over a plug-in opening in a wall of a housing for parallel bus bars. The plug-in opening has several stabs, each of which is connected to a bus bar.

2. Background of Information

The doors of a plug-in opening in a duct of a busway system of the prior art are hinged and swing outwardly in a transverse direction relative to the longitudinal axis of the duct or housing. The bus bars are arranged one above the other in the duct or housing and extend parallel to the longitudinal axis of the duct or housing. The bus bars can either be spaced-apart or they can be stacked on top of each other. In both instances, the bus bars are insulated; are silverplated at all contact surfaces; and are held firmly in place by appropriate means.

Generally, the bus bar arrangement, from top to bottom are ground, "A" phase, "B" phase, "C" phase, and Neutral. The housing is comprised of extrusion members, and the plug-in openings are on about 24" centers in the front or the rear extrusion members. Electrical connections are made to the several bus bars by way of stabs which are selectively attached in order to obtain the desired electrical system, such as, three wire; three wire with ground; four wire; or four wire with ground. These stabs are attached to the bus bars and extend outwardly through one of several compartments or cavities of a brick, which is installed into a plug-in opening in the front or the rear extrusion member of the housing of the busway system.

In these present day brick designs, a hinged door is provided over the brick to close off access to the cavities of the brick when no plug-in unit is installed in the brick. This hinged door can easily be left open when the plug-in unit is removed from the brick.

There remains, therefore, a need for a cover assembly used in conjunction with a plug-in opening of a busway system which prohibits intentional or unintentional access to the cavities of a brick when the plug-in unit is removed from the brick, or when no plug-in unit is installed into the brick.

SUMMARY OF THE INVENTION

The present invention has met the above-described need. It employs a brick installed over a plug-in opening of a busway system, and which brick provides several cavities in which one of the stabs extends for an electrical connection to the bus bars in the busway system. Additionally, a shutter is provided which fits over the several cavities of the brick for closing the cavities. A cam-linkage assembly reciprocates the shutter which runs along tracks provided on the brick.

The cam-linkage assembly can only be activated to move the shutter by a probe which is associated with a plug-in unit, and which probe enters a guide opening in the brick to contact the cam. As a result, the cam is rotated and moves the linkage which, in effect, moves the shutter to open the cavities.

A spring biases the cam-linkage assembly and it moves the cam-linkage assembly along with the shutter when the probe is removed from the aperture again closing off access to the cavities of the brick when the plug-in unit is removed from the brick.

A probe may be provided on both ends of the plug-in unit for contacting a cam of a cam-linkage assembly which would then be provided on both sides of the brick.

It is, therefore, an object of the present invention to provide a device for a plug-in opening of a busway system which restricts unintentional exposure of the stabs.

It is a further object of the present invention to provide a device for a plug-in opening of a busway system which provides a shutter mechanism fitting over openings or cavities in a brick which cavities are automatically open when an electrical plug-in unit is installed onto the brick to provide access to the electrical stabs, and which shutter mechanism immediately closes the openings or cavities and shuts off access to the stabs therein when the electrical plug-in unit is removed.

These and other objects of the present invention will be fully understood and appreciated from the following description of the invention upon reference to the illustrations appended hereto.

BRIEF DESCRIPTION OF THE DRAWINGS

FIG. 6 is a plan view of a shutter of the present invention in preassembled form;

FIG. 7 is a front elevational view of the shutter of FIG. 6;

FIG. 8 is a side elevational view looking into the right of the shutter of FIG. 6;

FIG. 9 is a plan view of a cam of the present invention;

FIG. 10 is a side elevational view of the cam of FIG. 9;

FIG. 11 is a plan view of a link of the present invention;

FIG. 12 is a side elevational view of the link of FIG. 11;

FIG. 18 is a plan view of the cover assembly of the present invention with the shutter fully open and parts of the plug-in unit being shown in cross-section when the plug-in unit is completely installed on the busway system which is partly broken away; and FIG. 19 is a side elevational view of the cover assembly of FIG. 18 showing the shutter of the present invention in its fully open positioning as a result of the plug-in unit (shown schematically in cross section) being installed onto the busway system (shown in cross section), which open positioning of the shutter exposes the several stabs housed in the cavities of the brick of the cover assembly of the present invention.

DESCRIPTION OF THE PREFERRED EMBODIMENT

Figure 3:
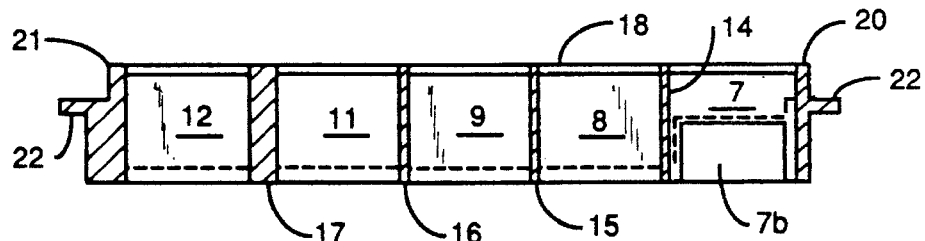
FIG. 3 is a cross-sectional view taken along lines 3—3 of FIG. 1.
Figure 4:
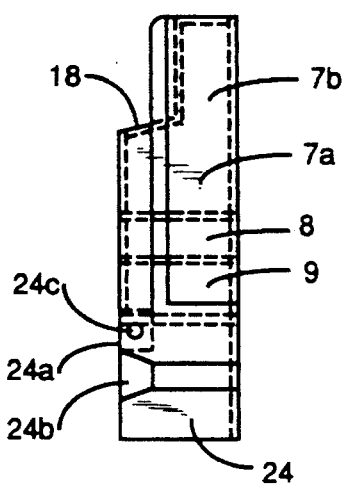
FIG. 4 is a side elevational view looking into the right of the brick of FIG. 1.
Figure 5:
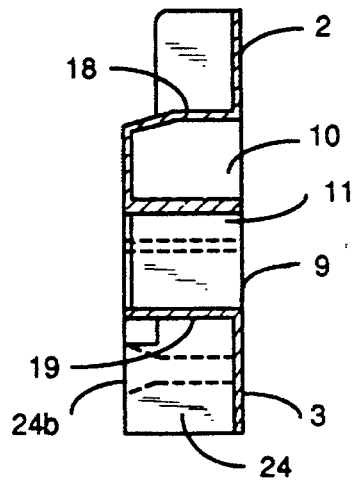
FIG. 5 is a cross-sectional view taken along lines 5—5 of FIG. 1.

Referring first to FIGS. 1–5 there is shown a brick 1. This brick 1 is preferably made of a Thermoset plastic, and is preferably a singular, molded piece of material. Brick 1 has longitudinal portions 2 and 3, transverse portions 4 and 5 and mid-portion 6. Mid-portion 6 has several cavities 7, 8, 9, 10, 11, 12, and 13 which project outwardly from the flat planar surfaces of longitudinal portions 2 and 3, as best shown in FIG. 5. These cavities 7, 8, 9, 11 and 12 receive stabs (not shown) which make an electrical connection to the bus bars of the busway system in which the present invention is used, and more about which will be discussed hereinbelow.

Figure 1:
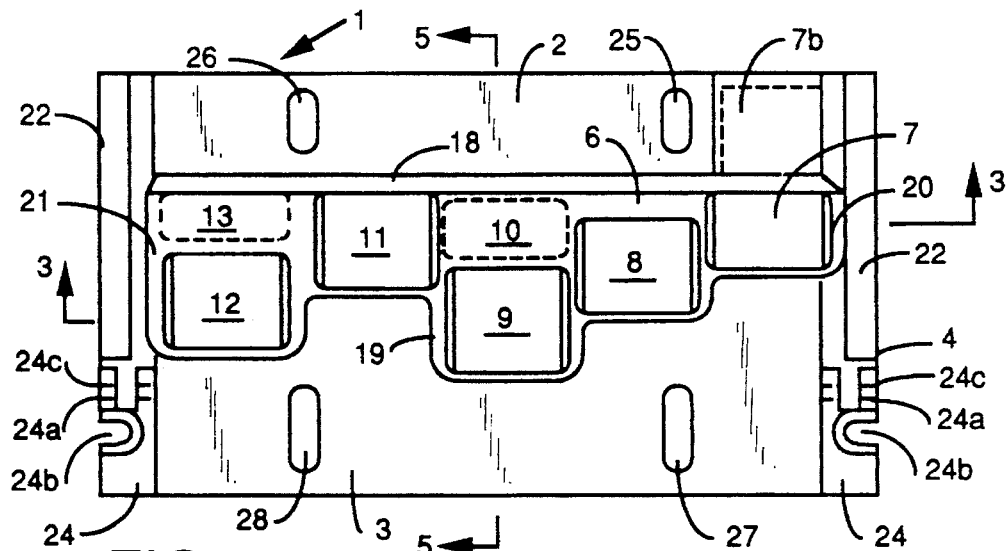
FIG. 1 is a plan view of a brick cover of the present invention in preassembled form.
Figure 2:
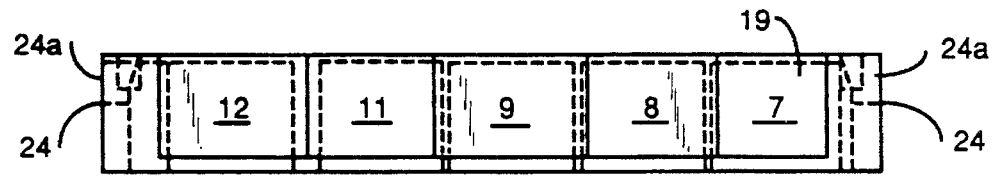
FIG. 2 is a from elevational view of the brick of FIG. 1.

As can be seen in FIGS. 1 through 5, cavities 7–13 are separated from each other by walls, some of which are indicated at 14, 15, 16 and 17 in FIG. 3 for clarity purposes, and which walls completely isolate the stabs from each other. Cavities 8, 9, 11 and 12 and part 7a of cavity 7 are opened from the front to the back of brick 1, while cavities 10 and 13 and part 7b of cavity 7 are closed at the front of brick 1 and do not receive any stabs. Cavities 10 and 13 are generally formed in order to reduce the amount of material needed and to enhance the mechanical properties of brick 1.

As best shown in FIG. 4, cavity 7 has sections 7a and 7b, with section 7a being greater in depth than section 7b. Section 7a is used to accommodate an internal ground connection, whereas, optionally, section 7b is provided to accommodate an external ground connection.

Mid-portion 6 having cavities 7–13 has longitudinal walls 18 and 19, and end walls 20 and 21 as best shown in FIG. 1. Wall 18 has basically a straight configuration along the length of brick 1, and wall 19 has somewhat of a serpentine configuration or outline which follows the location of cavities 7, 8, 9, 11, and 12.

As particularly shown in FIGS. 1, 2, and 3, the transverse portions 4 and 5 of brick 1 are essentially mirror images of each other and have a ledge or lip 22, best shown in FIGS. 1 and 3, and a bracket portion 24 directly adjacent to lip 22 as best shown in FIGS. 1 and 2. Each bracket portion 24 has a U-shaped area 24a when viewed in the plan view of FIG. 1 and a guide opening 24b. As shown in FIGS. 4 and 5, guide opening 24b is camfered and extends through brick 1, more about which will be discussed hereinbelow.

Referring particularly to FIG. 1, longitudinal portion 2 of brick 1 has slots 25 and 26, and longitudinal portion 3 has slots 27 and 28 for receiving fastening means, such as bolts, for mounting of brick 1 to a busway system.

FIGS. 6, 7, and 8 show a shutter 29 which is an additional component of the cover assembly of the present invention. As shown particularly in FIG. 6, shutter 29 essentially has a flat planar surface 30, longitudinal walls 31 and 32 (FIG. 6), and sidewalls 33 and 34.

Longitudinal wall 32 has a serpentine configuration which corresponds to that of wall 19 of mid-portion 6 of brick 1 of FIG. 1. The serpentine configurations of wall 19 of mid-portion 6 and of wall 32 of shutter 29 are dictated by the location of the cavities 7, 8, 9, 11 and 12 of brick 1, and results in a minimal amount of material being used and therefore a reduction in weight for brick 1 and shutter 29, and a minimum sliding distance of shutter 29 relative to brick 1. Sidewalls 33 and 34 of shutter 29 are constructed similarly to each other, and will be described with particular reference to FIGS. 7 and 8.

As shown best in FIG. 8, sidewall 33 has a main portion 33a with an aperture 33b and an ear portion 33c with an aperture 33d, and as best shown in FIG. 7, sidewall 33 has a lip 35 along its inner surface which extends approximately the length of sidewall 33. Sidewall 34 has features similar to that of sidewall 33, with a lip 36 along its inner surface as shown in FIG. 7.

FIGS. 9 and 10 show a cam 37, and FIGS. 11 and 12 show a link 38, which components comprise a cam-linkage assembly of the present invention.

Cam 37 of FIGS. 9 and 10 have a lower portion 37a with an aperture 37b and a U-shaped portion 37c, as particularly shown in the cross-section of FIG. 10. Each of the legs of U-shaped portion 37c has an aperture 37d.

Link 38 of FIGS. 11 and 12 has an elongated body 38a and ends 38b and 38c with apertures 38d and 38e, respectively.

Figure 15:
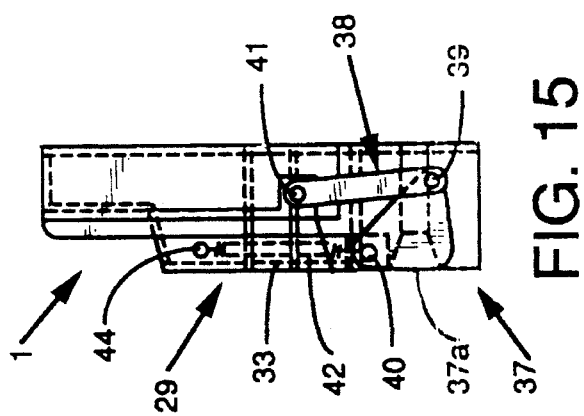
FIG. 15 is a side elevational view looking into the right of the assembled components of the cover assembly of FIG. 13.
Figure 13:
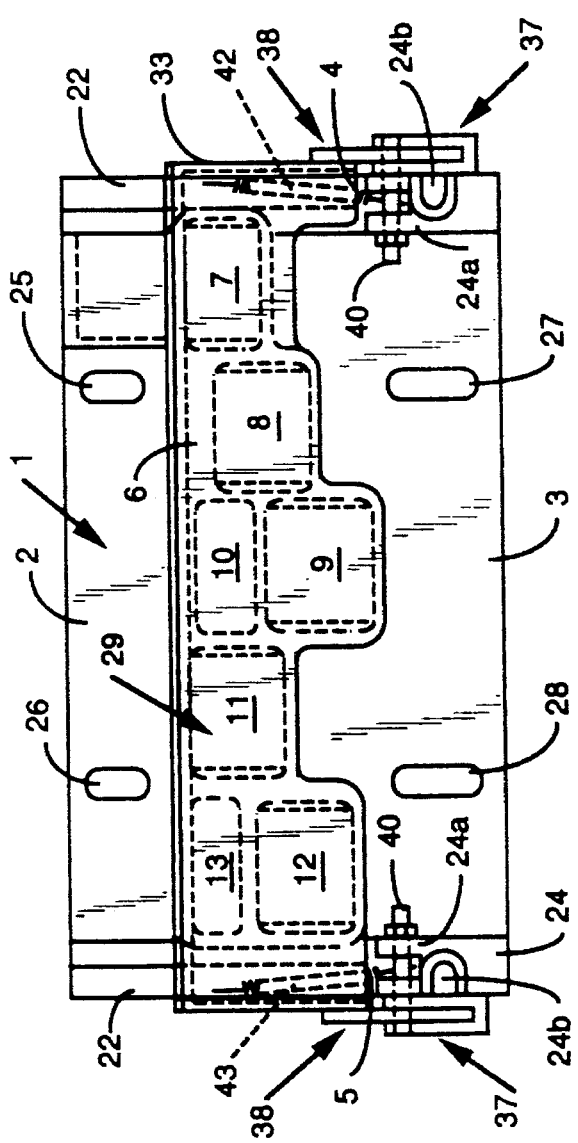
FIG. 13 is a plan view of the cover assembly of the present invention of FIGS. 1–12 in assembled form prior to its installation in a busway system.
Figure 14:
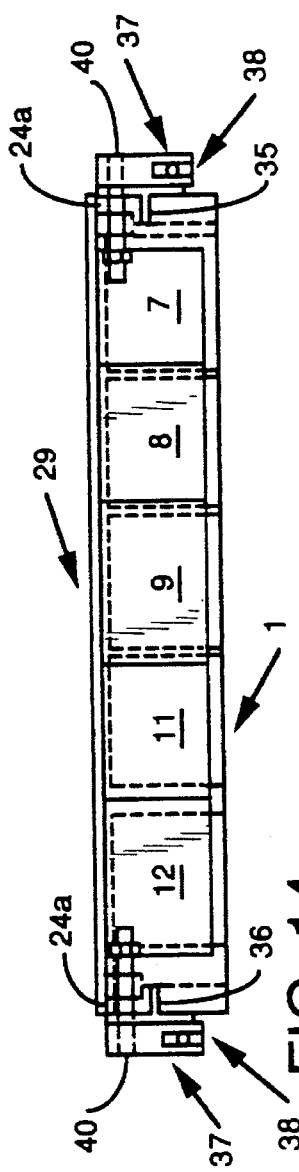
FIG. 14 is a front elevational view of the cover assembly of FIG. 13.

Brick 1, shutter 29, cam 37 and link 38 of FIGS. 1 through 12 are assembled together in FIGS. 13, 14, and 15 prior to being mounted on a busway system as an assembly.

As shown in FIGS. 13, 14 and 15, shutter 29 fits over cavities 7 through 13 of mid-portion 6 of brick 1. As shutter 29 is installed on brick 1 for assembling the present invention, lips 35 and 36 of the shutter 29 are made to engage an undersurface of lip 22 of transverse portions 4 and 5 of brick 1. This construction holds and guides shutter 29 along brick 1 as shutter 29 is being moved along lips 22 of brick 1 (FIG. 13).

As shown best in FIG. 15, cam 37 and link 38 are connected together by fastening means, such as by a pin indicated at 39. Pin 39 extends through the apertures 37d in upper portion 37c of cam 37 and through aperture 38e of link 38 after end 38c is disposed between the legs of U-shaped portion 37c of cam 37 when referring to FIGS. 9 through 12.

Cam 37 is attached to brick 1 by a fastening means, such as by a pin indicated at 40 in FIGS. 13 through 15. As particularly shown in FIGS. 13 and 14, pin 40 extends through an aperture 24c of U-shaped area 24a (shown particularly in FIGS. 1 and 4) of each bracket portion 24 of transverse portions 4 and 5 of brick 1.

Still referring to FIGS. 13 through 15, link 38 is attached to both sidewalls 33 and 34 of shutter 29. This is done by means of a pin indicated at 41 in FIG. 15. Pin 41 extends through aperture 38d of end 38b of link 38 of FIGS. 11 and 12 and through aperture 33d of ear portion 33c of sidewalls 33 and 34 of shutter 29.

As best shown in FIG. 13, a biasing means, such as a coiled spring indicated at numerals 42 and 43 is located on opposite ends of shutter 29. Each spring 42 and 43 is attached at its one end to pin 40 and is attached at its other end to a pin indicated at numeral 44 of FIG. 15 which extends through aperture 33b of both sidewalls 33 and 34 of shutter 29, shown only in sidewall 33 of FIG. 8.

As best shown in FIG. 13, cam 37 lies adjacent to guide opening 24b of bracket portion 24 on each transverse portion 4 and 5 of brick 1. Springs 42 and 43 are in a pretensioned positioning in FIG. 13 and are used to return shutter 29 to its closed positioning over cavities 7–13 after shutter 29 is moved to provide access into cavities 7, 8, 9, 11 and 12.

Figure 17:
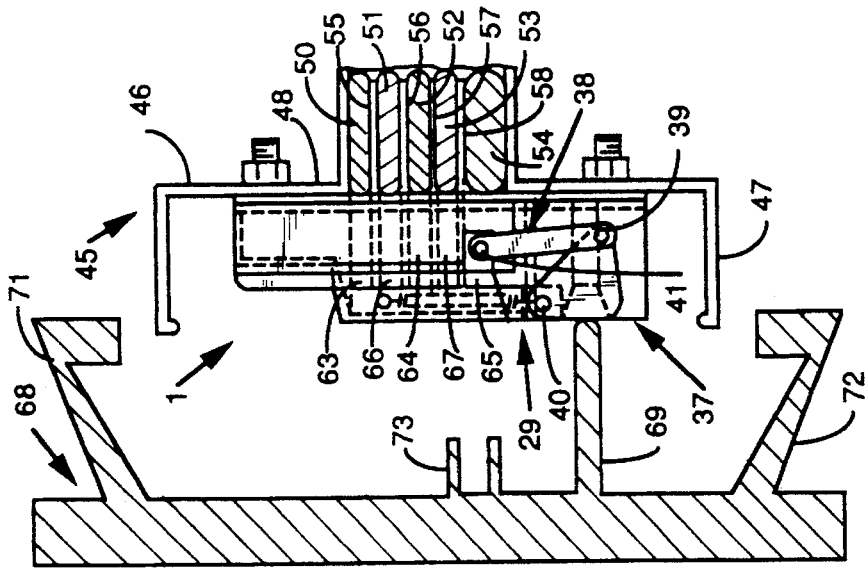
FIG. 17 is a side elevational view of the cover assembly of FIG. 16 and includes a plug-in unit shown schematically in cross section prior to it being mounted onto the busway system (shown in cross section) for activation of the present invention.
Figure 16:
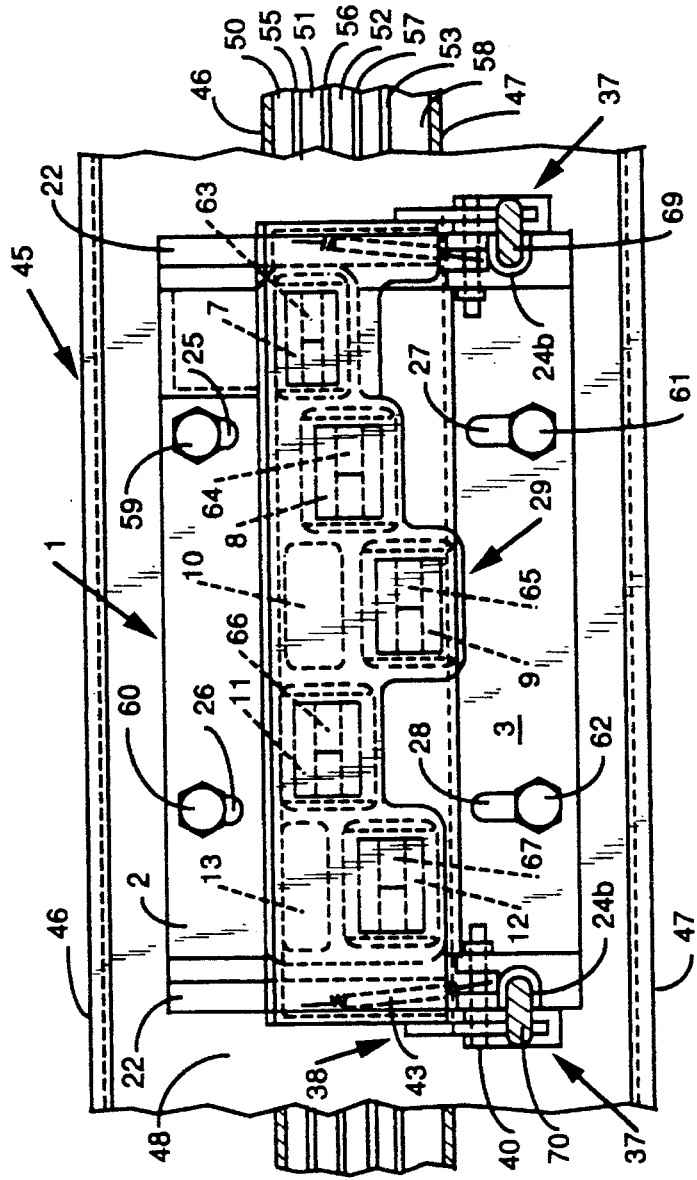
FIG. 16 is a plan view of the assembled cover assembly of the present invention and installed in a busway system which is partly broken away and with the shutter in a closed position prior to a plug-in unit being completely installed with the probes of the plug-in unit being shown in cross-section.

FIGS. 16 and 17 show the mounting of the cover assembly of the present invention on a typical busway system 45. Busway system 45 typically consists of housing members 46 and 47 connected together by a front cover 48 and a back cover (not shown). Housing members 46 and 47, front cover 48, and back cover of busway system 45 enclose a plurality of bus bars 50, 51, 52, 53 and 54 shown particularly in FIGS. 16 and 17. Housing members 46 and 47, front cover 48, and the rear cover may be made of extruded aluminum, and may be welded, bolted, or riveted together.

Bus bars 50–54 are fully rounded edge and run longitudinally through the housing of busway system 45, and are isolated from each other their entire length by a uniform layer of insulation indicated at 55, 56, 57 and 58. Bus bars 50–54 can be either high strength, 55% minimum conductivity aluminum or 98% conductivity pure copper.

As is conventional in busway systems, and as discussed hereinabove, there are several plug-in openings at several locations along front cover 48 and, possibly, the rear cover of busway system 45. The cover assembly of the present invention comprising brick 1, shutter 29, cam 37, and link 38 in assembled form are placed over one of the plug-in openings (not numbered) and is secured to front cover 48 of the housing of busway system 45 by affixing nut and bolt assemblies 59, 60, 61, 62 into slots 25, 26, 27, and 28, respectively, along longitudinal portions 2 and 3 of brick 1.

As particularly shown in FIG. 16, shutter 29 shown in hardline is in its closed positioning to cover cavities 7, 8, 9, 11, and 12 which are indicated in FIG. 16 by dash lines. As stated hereinabove, an electrical connection to bus bars 50–54 is done by providing stabs indicated at numerals 63, 64, 65, 66, and 67 which extend perpendicularly relative to their respective bus bar. That is, stab 63 in cavity 7 is connected to bus bar 50 and is designated as being "Gnd" which stands for a ground connection. Stab 66 in cavity 11 is connected to bus bar 51 and is designated as "Aφ" which stands for phase A. Stab 64 in cavity 8 is connected to bus bar 52 and is designated as "Bφ" which stands for phase B. Stab 67 in cavity 12 is connected to bus bar 53 and is designated as "Cφ" which stands for phase C. And finally, stab 65 in cavity 9 is connected to bus bar 54 and is designated as "N" which stands for Neutral.

When shutter 29 is in its closed positioning of FIGS. 16 and 17 over cavities 7, 8, 9, 11, and 12, cam 37 and link 38 are in their positioning shown in FIG. 17. Opening of shutter 29 is accomplished when an electrical connection unit 68, better known in the art as a plug-in unit, is mounted onto busway system 45. As plug-in unit 68 is being mounted on busway 45, guide probes 69 and 70 of plug-in unit 68 enter guide openings 24b on both sides of brick 1.

Plug-in unit 68 is shown schematically in the drawings for clarity and brevity purposes, and a full description is not given herein since it is known to those skilled in the art. In view of the cover assembly of the present invention, plug-in unit 68 has been slightly modified with the addition of probes 69 and 70 mounted on the back of plug-in unit 68.

In addition to guide probes 69 and 70, plug-in unit 68 has flexible securing clamps 71 and 72 and several finger clusters, one of which is indicated at numeral 73 in FIG. 17. Each of finger clusters 73 slides onto and makes contact with one of the stabs 63–67 when unit 68 is installed onto busway system 45. Clamps 71 and 72 members and members 73 are old in the art.

As particularly shown in FIG. 16, probes 69 and 70 are generally oval in cross-section and wide enough to contact cam 37 as unit 68 is being mounted onto busway system 45.

As FIG. 17 illustrates the positioning of shutter 29, cam 37, link 38 and guide probe 69 prior to plug-in unit 68 being placed onto housing members 46 and 47, FIGS. 18 and 19 illustrate the positioning of shutter 29, cam 37, link 38, and guide probe 69 (guide probe 70 in FIG. 18), as well as finger cluster 73, and securing clamps 71 and 72 of plug-in unit 68 after plug-in unit 68 is fully installed onto busway system 45. Placement of plug-in unit 68 onto housing members 46 and 47 causes guide probes 69 and 70 to enter guide openings 24b along the transverse sides 4 and 5 of brick 1 and to contact cams 37 on both ends of brick 1.

This action causes cams 37 to rotate moving links 38 to slide shutter 29 along lips 22 of transverse sides 4 and 5 of brick 1 to open shutter 29. The result is that shutter 29 is moved to extend beyond brick 1 as shown in FIG. 19, spring elements 42 and 43 associated with cams 37 and links 38 are tensioned, and cavities 7a, 8, 9, 11, and 12 are completely opened with stabs 63–67 being exposed as shown in FIG. 18. Shutter 29 is shaded in FIGS. 18 and 19 to show this open position.

The several finger clusters 73 of plug-in unit 68 fit snugly around their respective stab as shown in FIG. 19 where finger cluster 73 engages stab 65 associated with bus bar 54.

It is to be noted that the design of housing members 46 and 47 is such that an appropriate clearance is provided with respect to housing member 46 so that shutter 29 can be moved in the manner described herein and shown in FIGS. 18 and 19.

When plug-in unit 68 is removed from busway system 45 guide, probes 69 and 70 are removed from guide openings 24b of brick 1. This allows springs 42 and 43 to relax, thereby forcing shutter 29 to be closed, and cams 37 and links 38 to be pivoted to return to their positioning of FIG. 17. Cavities 8, 9, 11, and 12 and part 7a of cavity 7 are again completely closed by shutter 29 as shown in FIG. 16 to prevent access to their respective stabs 63–67.

Shutter 29 is configured so that it extends over all of cavities 7a, 8, 9, 10, 11, 12, and 13, of brick 1 when shutter 29 is in its close positioning of FIGS. 16 and 17.

Busway system 45 may consist of aluminum bus bars in ratings of 400 to 4000 amps, or copper bus bars in ratings from 400 to 5000 amps.

One advantage of the present invention is that it has the ability to polarize the busway stabs in that it is physically impossible to make an improper electrical connection. That is, if plug-in unit 68 were rotated 180 degrees, the guide probes 69 and 70 being located at the top of shutter 29 would encounter interference from brick 1, making it impossible to place unit 68 onto busway system 45.

Even though a three phase bus bar system with ground and neutral connections has been shown and described, other bus bar systems can be used with the appropriate cavities in brick 1 being plugged or capped to prohibit access to the bus bars of that particular system.

Whereas, particular embodiments of the present invention have been described above for purposes of illustration, it will be appreciated by those skilled in the art that numerous variations of the details may be made without departing from the invention as described in the appended claims.

In accordance with the provisions of the patent statutes, we explained the principles and operation of our invention and have illustrated and described what we consider to be the best embodiments thereof.

What is claimed:

1. In combination with a busway system having a housing and a plurality of parallel bus bars extending through said housing, said housing having at least a front wall with a plug-in opening for access to said bus bars, each of said bus bars having stab means extending into said plug-in opening, a cover assembly, comprising:

a brick attachable to said front wall of said housing and having a plurality of cavities for forming several openings out of said plug-in opening, each of said several openings receiving one of said stab means of said bus bars, a shutter member carried by said brick and positioned over said several openings formed by said cavities in said brick, an operating mechanism including cam-linkage means connected to said shutter member for sliding said shutter member into a first position on said brick and into a second positioned on said brick, and connector means mountable onto said front wall of said housing and into said brick, said connector means having means for engaging said stab means of said bus bars and including means for engaging said operating mechanism for activating said operating mechanism for said shutter member upon installation of said connector means into said brick for said sliding of said shutter member into said first position for an opening of said several openings formed by said cavities of said brick and upon removal of said connector means from said brick for disengaging said operating mechanism for reactivating said operating mechanism and for allowing said shutter member to slide into said second position for said closing of said several openings formed by said cavities of said brick to prevent access to said stab means of said bus bars.

2. The combination of claim 1, wherein said cover assembly comprises track means, wherein said shutter member is slidable in said track means of said brick, and wherein said operating mechanism for said shutter member is spring biased for said closing of said several openings upon said removal of said connector means from said brick of said cover assembly.

3. The combination of claim 2, wherein said openings of said brick are vertically and laterally offset with respect to each other to align with their respective bus bar and stab means to form an arrangement, and wherein said shutter member has a configuration corresponding to the configuration of said arrangement of said several openings of said brick.

4. The combination of claim 2, wherein said means for engaging said operating mechanism includes probe means on said connector means, and wherein said cam-linkage means of said operating mechanism includes cam means engagable by said probe means of said connector means for said sliding of said shutter member in said first position for said opening of said several openings formed by said cavities of said brick.

5. The combination of claim 4, wherein said cam-linkage means further includes a linkage mechanism pivotally connected to said cam means, wherein said cam means is pivotally connected to said brick, and wherein said linkage mechanism is pivotally connected to said shutter member.

6. The combination of claim 5, wherein said brick has opposed walls, wherein said cam means and said linkage mechanism are mounted along at least one of said opposed walls of said brick, wherein said brick further includes aperture means located near said cam means of said operating mechanism for said shutter member, and wherein said probe means of said connector means is receivable in said aperture means of said brick for contacting said cam means and, whereby said cam means is rotated to operate said linkage mechanism and therefore slide said shutter member in said track means in said first position for said opening of said several openings formed in said cavities of said brick for access to said each of said stab means of said bus bars.

7. The combination of claim 6, wherein said cam means and said linkage mechanism are mounted along each of said opposed walls of said brick.

8. The combination of claim 6, wherein said shutter member has opposed side walls, and wherein said track means consists of ledge means formed on said opposed walls of said brick and further comprising receiving means disposed on said opposed walls of said shutter member for receiving said ledge means of said brick.

9. In combination with a busway system having a housing and a plurality of parallel bus bars extending through said housing, said housing having at least a front wall with a plug-in opening for access to said bus bars, each of said bus bars having stab means extending into said plug-in opening, a cover assembly, comprising:

a brick attachable to said front wall of said housing and having a plurality of cavities for forming several openings out of said plug-in opening, each of said several openings receiving one of said stab means of said bus bars, shutter means carded by said brick for opening and dosing said several openings formed by said cavities of said brick, and connector means mountable onto said front wall of said housing and into said brick, said connector means having means for engaging said stab means of said bus bars and including probe means for operating said shutter means upon installation of said connector means into said brick for said opening of said several openings formed by said cavities of said brick and for allowing operation of said shutter means upon removal of said connector means from said brick for said closing of said several openings formed by said cavities of said brick to prevent access to said stab means of said bus bars, said cover assembly comprising track means for reciprocable movement of said shutter means, said shutter means comprising a shutter member slidable in said track means of said brick, and an operating mechanism for said shutter member being spring biased for said closing of said several openings upon said removal of said connector means from said brick of said cover assembly, said operating mechanism for said shutter member including cam means pivotally connected to said brick and engagable by said probe means of said connector means to slide said shutter member for said opening of said several openings formed by said cavities of said brick and a linkage mechanism pivotally connected to said cam means and pivotally connected to said brick, said brick having opposed walls, said cam means and said linkage mechanism being mounted along at least one of said opposed walls of said brick, said brick further including aperture means located near said cam means of said operating mechanism for said shutter member, and said probe means of said connector means being receivable in said aperture means of said brick for contacting and rotating said cam means to operate said linkage mechanism and therefore slide said shutter member in said track means for said opening of said several openings formed by said cavities of said brick for access to said each of said stab means of said bus bars.

10. The combination of claim 9, wherein said cam means and said linkage mechanism are mounted along each of said opposed walls of said brick.

11. The combination of claim 9, wherein said shutter member has opposed side walls, and wherein said track means consists of ledge means formed on said opposed walls of said brick and further comprising receiving means disposed on said walls of said shutter member for receiving said ledge means of said brick.

12. The combination of claim 9, wherein said openings of said brick are vertically and laterally offset with respect to each other to align with their respective bus bar and stab means to form an arrangement, and wherein said shutter member has a configuration corresponding to the configuration of said arrangement of said several openings of said brick.

* * * * *